United States Patent [19]

Druschitz et al.

[11] 4,196,831
[45] Apr. 8, 1980

[54] PUNCHED PAPER TAPE FEED WHEEL MECHANISM

[75] Inventors: Alexander Druschitz, Park Ridge; Ingard B. Hodne, Northbrook, both of Ill.

[73] Assignee: Teletype Corporation, Skokie, Ill.

[21] Appl. No.: 956,837

[22] Filed: Nov. 1, 1978

[51] Int. Cl.² ............................................. G03B 1/24
[52] U.S. Cl. ................................... 226/79; 226/179
[58] Field of Search ....................... 226/75, 76, 77, 78, 226/79, 179

[56] References Cited

U.S. PATENT DOCUMENTS

| | | | |
|---|---|---|---|
| 2,650,090 | 8/1953 | Davidson | 226/79 X |
| 3,116,000 | 12/1963 | Wales | 226/76 |
| 3,181,759 | 5/1965 | Maples | 226/76 X |
| 3,549,068 | 12/1970 | Calano | 226/79 |
| 4,032,055 | 6/1977 | Costa | 226/76 |
| 4,126,257 | 11/1978 | Drillick | 226/76 |

*Primary Examiner*—Edward J. McCarthy
*Attorney, Agent, or Firm*—J. C. Albrecht

[57] ABSTRACT

The elements of a drive assembly for punched paper tape are arranged in a fixed relation on a shaft (42) to which the paper feed wheel (70) is attached. The assembly includes a drive mechanism (25 or 27) for selectively imparting equal increments of rotational motion to the shaft, first and second ball bearing assemblies (65, 75), spacers (74, 68, 69) and a nut (76). The shaft assembly is slidable within holes in the frame sideplates (71, 73) and within curved surfaces of projections (66, 67) of the paper guide body (28).

3 Claims, 16 Drawing Figures

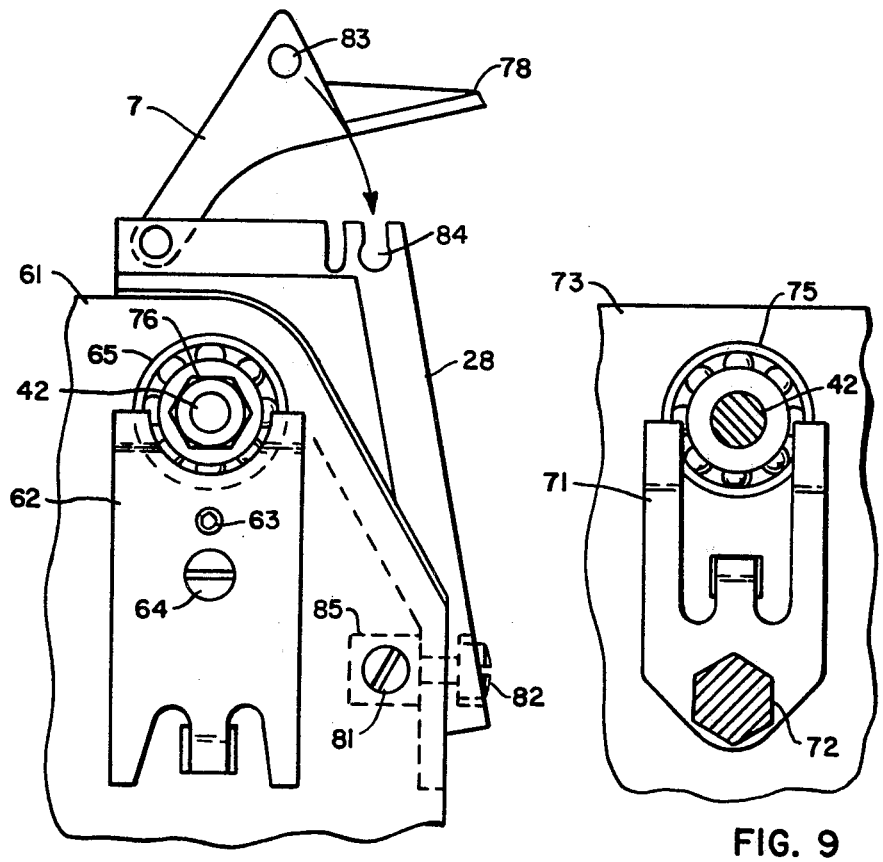
FIG. 8
FIG. 9
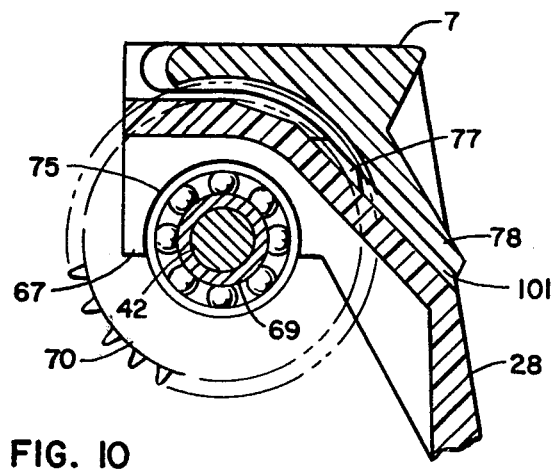
FIG. 10

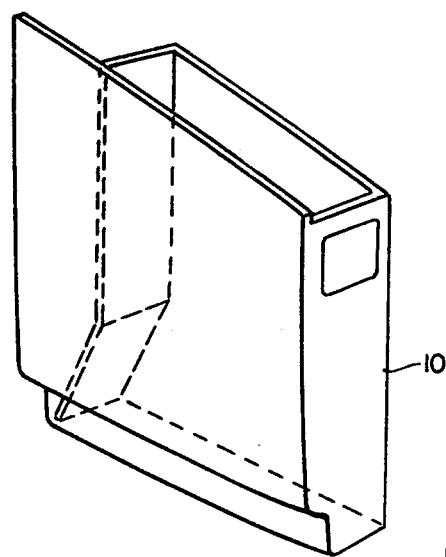
FIG. 14
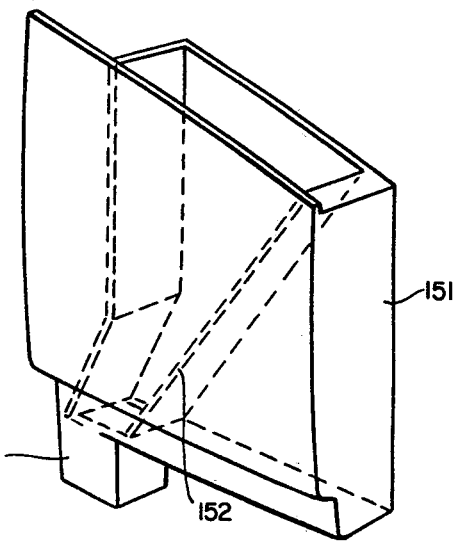
FIG. 15
FIG. 16
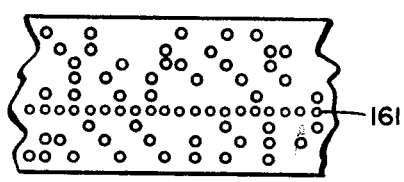

PUNCHED PAPER TAPE FEED WHEEL MECHANISM

DESCRIPTION

1. Technical Field

This invention relates to assemblies for processing paper tape which is punched to provide indicia of data.

2. Background Art

Punched paper tape is processed in a punch assembly which selectively establishes patterns of holes and spaces laterally across a substantially opaque paper tape to create words of data. Punched paper tape is generally encoded in a 5 level code or an 8 level code. In the 5 level code there is the possibility of punching a maximum of 5 holes laterally across the tape and in the 8 level code there is the possibility of punching a maximum of 8 holes laterally across the tape. Additionally, punched paper tape is provided with drive holes which comprise spaced apart drive apertures longitudinally disposed on the tape.

The assemblies which process such punched paper tape include toothed drive wheels which engage the drive apertures in the tape to advance the tape in fixed increments through the assembly. Paper tape which is encoded by a paper tape punch assembly to store data is read from the punched paper tape by a reader assembly. The reader assembly comprises a plurality of light sources laterally disposed across a portion of the reader assembly which is traversed by the paper tape as it is passed through the reader assembly and a corresponding plurality of light receptors which are aligned with the light sources. Since the tape is substantially opaque, light from the light sources will impinge upon the corresponding light receptors only in those positions in which data holes have been punched in the tape. The tape is advanced through the reader assembly by a sprocket wheel which is arranged to advance the tape such that the positions on the tape at which holes have been or may have been punched are aligned between the corresponding light sources and light receptors.

A paper tape punch and the paper tape reader each have independent utility, however, it is common to associate a paper tape punch and a reader in a single assembly. Such an assembly serves to create a local punched tape in response to incoming data signals from a distant station or in response to local signals from a keyboard or other input arrangement. The paper tape punch and reader may be physically arranged in a serial manner such that the paper is advanced through the two assemblies in unison and a loop is provided in the tape between the output of the punch and the input of the reader. Accordingly, when incoming signals are received from a line, a tape is created by the punch assembly and this tape is then read by the reader assembly. The output signals of the reader assembly typically are used to operate a printer to create a hard copy of the message.

DISCLOSURE OF THE INVENTION

In accordance with the present invention, a paper tape drive assembly is slidably mounted on a frame which comprises first and second spaced apart sidewalls which are held in fixed relation by spacers. The drive assembly comprises: a shaft, and arrangement for imparting selectively increments of rotational motion to the shaft, first and second ball bearing assemblies mounted in spaced apart relation on the shaft and securely fastened thereto at a spacing which coincides with spacing between the sidewalls. The frame sidewalls have opposed opening therein for receiving the ball bearing assemblies in a close but slidable fit. A toothed feed wheel is mounted on the shaft intermediate ball bearing assemblies. Spring means which are mounted on the exterior surface of one of the sidewalls is arranged to force the drive assembly laterally toward the other sidewall. An adjusting plate is attached to the surface of the other sidewall of the frame for defining the lateral limit of the shaft. The assembly further comprises a guide body which has an external surface for guiding tape processed by the assembly, a cover for holding tape being processed adjacent the guiding surface. An opening in the body exposes the toothed feed wheel. The body fits snugly between the sidewalls and the body comprises first and second downwardly depending legs each having curved surfaces for engaging the outer surfaces of the ball bearing retaining rings. The downward depending legs are proportioned to maintain the desired relation between the guiding surface of the body and the face of the toothed wheel.

In summary, the paper guide surface is held in proper relation to the paper feed wheel since the guide surface is indexed to the outer surface of the ball bearing assemblies and thus to the axis of the shaft by the downwardly depending legs. Additionally, the assembly is slidable within the frame to permit lateral adjustment of the feed wheel relative to the edge of the tape guide surface.

THE DRAWINGS

FIGS. 8 through 10 illustrate further details of the feed wheel assembly for the punch and reader assemblies;

FIGS. 14 and 15 are views of a chad box and a chad chute extender; and

FIG. 16 shows a section of punched tape.

DETAILED DESCRIPTION

Figure 1:
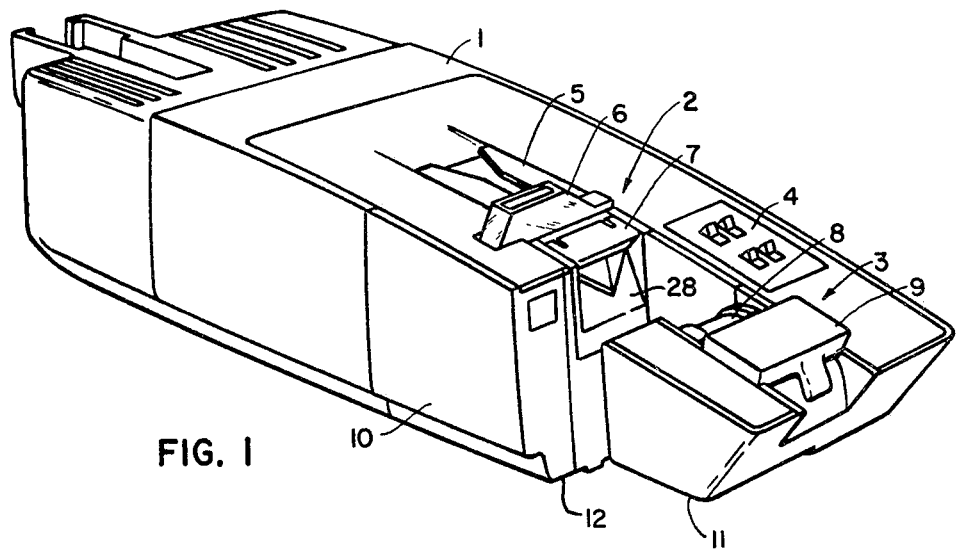
FIG. 1 is an overall perspective view of a paper tape punch and reader assembly arranged to mount on a flat surface such as a table.

In FIG. 1 there is shown an overall punch and reader assembly 1 which comprises the punch assembly 2 and the reader assembly 3. The supply reel for the paper tape and the paper tape is not shown in FIG. 1, however, it is to be understood that the paper tape is stored on a reel which may be supported from the assembly 1 or may be supported separately. The tape enters the guide 5, passes through the punch assembly and exits under the cover plate 7. The material which is punched from the tape as it passes through the punch assembly is called "chad", and the chad exits throught the chad chute 6 and into the chad container 10. The assembly of FIG. 1 has a flat bottom surface, and thus may be mounted on a flat surface such as a desk or table in close proximity to a keyboard and printer assembly. In the event that the punch and reader assembly is to be located on a pedestal, the chad receptacle 10 may be replaced by an extender assembly (not shown) to permit the chad to be delivered to a larger receptacle which may be located on the floor or supported from the pedestal.

As the punched paper tape exits from the punch assembly under the cover 7, it is permitted to form a short loop and then to enter the reader assembly over the guide 8 and under the cover 9. The reader guide 8 is arranged to accommodate both 5 level and 8 level tape without change. The paper which exits from the reader assembly may be stored for future use or future reference.

In FIG. 1 the lower surface 11 of the reader assembly is displaced vertically upward relative to the lower surface 12 of the remainder of housing. This relief permits the punched paper tape at the exit of the punch assembly to be routed under the reader assembly and to storage without processing by the reader.

Figure 2:
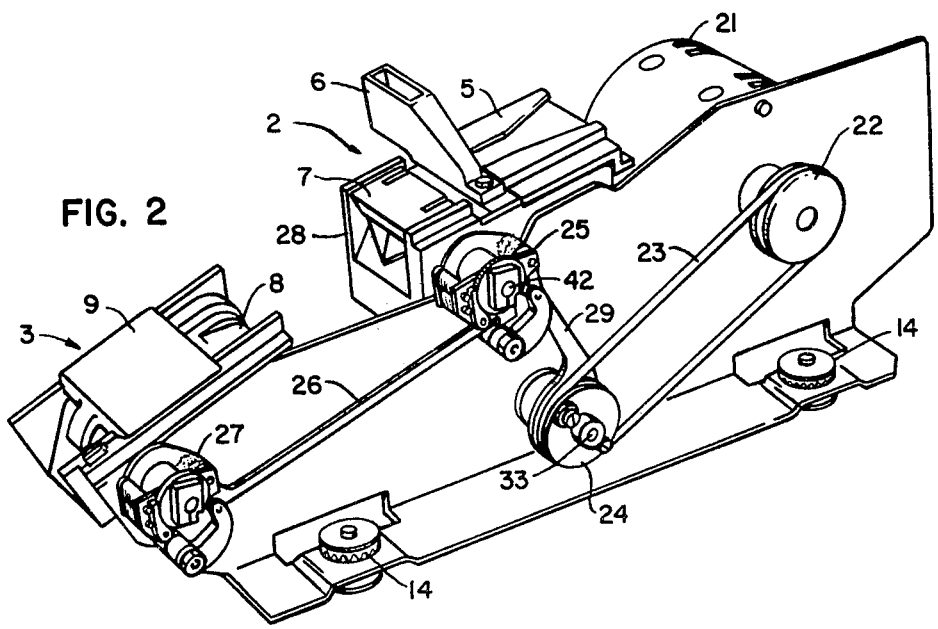
FIG. 2 is a perspective view of a paper tape punch and reader assembly with the cover shown in FIG. 1 removed.

The assembly 4 in FIG. 1 comprises switches for controlling the punch and reader assembly and associated electronics are not shown in FIG. 2.

FIG. 2 illustrates the principle elements of the punch and reader assembly with the cover 1 removed. Paper tape is advanced through the punch and reader assemblies in unison by the corresponding feed wheels in these assemblies. The feed wheels are driven by the drive assemblies 25 and 27 respectively. These drive assemblies operate generally in accordance with the teachings of U.S. Pat. No. 3,995,504. A general description of the drive assembly will be given later herein with respect to FIG. 3. The drive assemblies 25 and 27 rely upon the application of periodic motion to rocker plates which form an integal part of each of the assemblies. The periodic motion is provided by the eccentric assembly 24 which is driven by the belt 23. The motor 21 and the pulley 22 serve to linearly drive the belt 23. The periodic motion is transmitted from the eccentric assembly 24 to the drive mechanism 25 by means of the arm 29. The drive mechanism 25 and the drive mechanism 27 are coupled by the link 26 so that substantially identical periodic movement occurs in the two drive mechanisms 25 and 27.

As seen in FIG. 2, the punch assembly, the reader assembly and the common drive motor 21 are all mounted serially in line on a common L shaped plate 13 and this plate is secured to the base of the housing (not shown in FIG. 2) by the flexible mounting 14. Accordingly, proper alignment of the paper tape and of the drive mechanisms is assured while retaining physical vibration isolation between the active assemblies and the housing.

Figure 3:
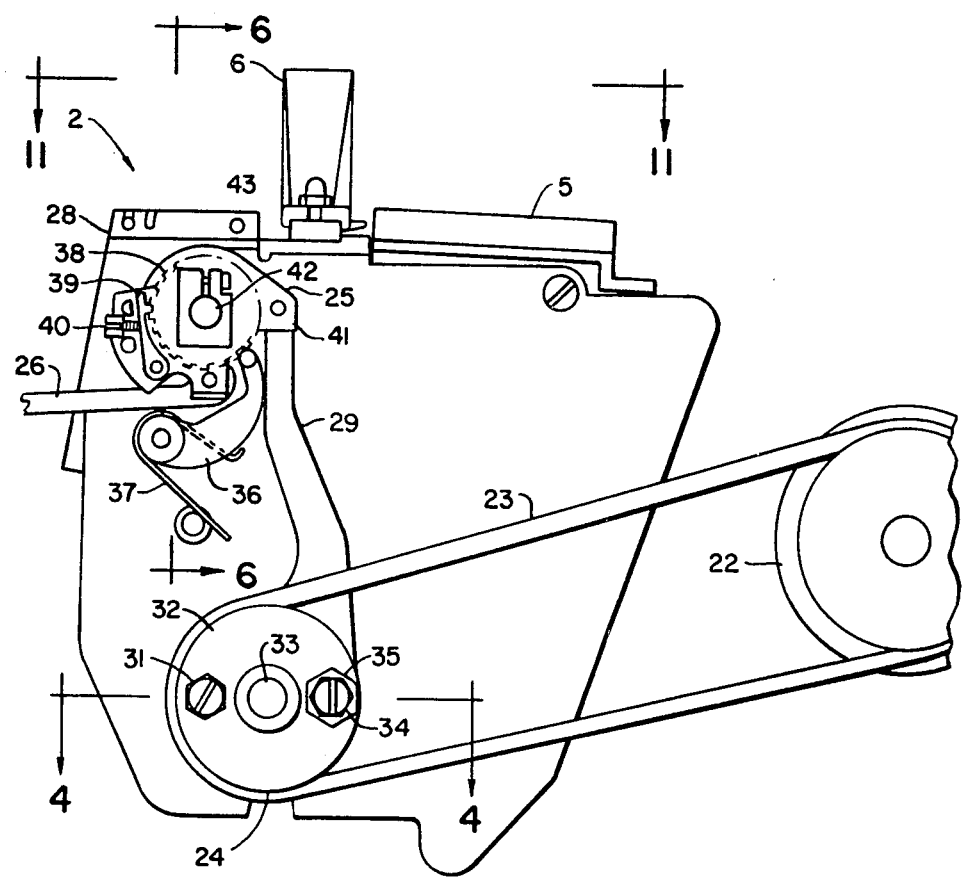
FIG. 3 illustrates an arrangement for effecting intermittent motion of the paper tape as it proceeds through the punch assembly.

FIG. 3 shows the drive assembly 25 of the punch assembly and the eccentric 24 in somewhat greater plan detail.

In FIG. 3 there is a rocker plate 41 which is driven by the link 29. A coil assembly 40 and an associated armature 39 are mounted on the rocker plate 41, and these serve to effect selective engagement between the armature 39 and the toothed wheel 38. The magnet coil assembly 40 is activated to disengage the armature 39 from the toothed wheel 38. Timing for the operation of the magnet coil 40 is obtained by a timing wheel (not shown) which is coupled to the shaft 33. The timing wheel generates signals which occur at or near zero velocity of the rocker plate 41. The toothed wheel 38 is coupled to the shaft 42 and as will be seen with respect to FIG. 6, the shaft 42 is coupled to the feed wheel for engaging the paper tape. The detent 36 is held in engagement with the toothed wheel 38 by the spring 37. The rocker plate 41 is driven between two extreme limits and the direction of travel of the shaft 42 is determined by the timing of the engagement of the armature 39 with the toothed wheel 38. If the armature 39 is allowed to engage the toothed wheel 38 at one limit of motion of the rocker plate 41, the toothed wheel 38 will be driven in a first direction; and if the armature 39 engages the toothed wheel 38 when the rocker plate is at the second extreme limit there will be motion of the toothed wheel in the opposite direction.

The application of the drive mechanism 25 is a practical environment requires tight manufacturing tolerances to assure accurate timing between the timing signals derived from the timing arrangement attached to the shaft 33 and the periodic motion applied to the drive mechanism from the eccentric 24 via the link 29. In order to compensate for deviations in manufacturing, a novel adjustable eccentric assembly 24 is utilized. The adjustable eccentric is shown in plan detail in FIG. 4.

Figure 4:
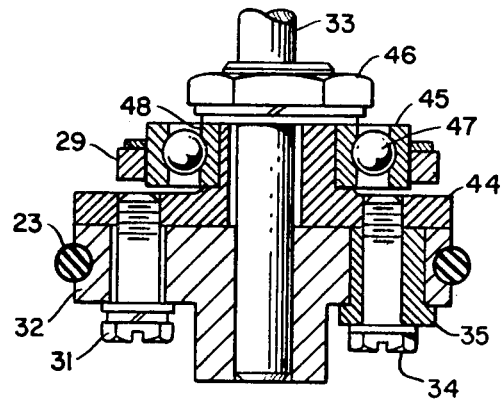
FIG. 4 shows an arrangement for adjusting the eccentric drive of FIG. 3.

In FIG. 4 the plate 32 is rigidly fixed to the shaft 33 by a pin or set screw 51. This plate includes a groove for receiving the drive belt 23 and apertures to receive the locking screw 31 and the adjusting elements 34 and 35. The link 29 has a circular opening therein which engages the retainer ring 49 of a ball bearing assembly. The further elements of the ball bearing assembly are the balls 47 and the race 48. The race 48 at the inside thereof engages the body 44. The lateral position of the body 44 relative to the plate 32 is determined by the rotational position of the element 35 which is secured by the screw 34. The eccentric assembly 24 of FIGS. 3 and 4 is adjusted by loosening the locking screw 31 and the locking screw 34 and rotating the element 35 to obtain the desired lateral relation of the body 44 and the plate 32. Once the desired lateral position has been achieved, the locking screw 34 and locking screw 31 are tightened. As seen in FIG. 4 the nut 46 engages a threaded portion of the eccentric body 44 to secure the ball bearing assembly to the body 44.

Figure 5:
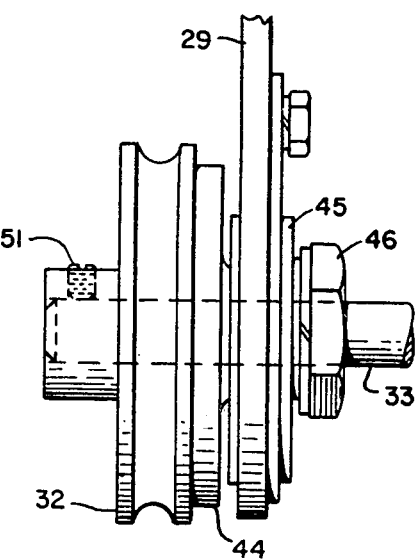
FIG. 5 is an end view of the assembly of FIG. 4.

FIG. 5 is an edge view of the arrangements of FIG. 4. FIG. 4 illustrates how the nut 46 secures the race 48 of the ball bearing assembly to the body 44. FIG. 5 illustrates how the set screw 51 serves to secure the plate 32 to the shaft 33. Additionally, FIG. 5 illustrates how the link 29 is mounted on the outer surface of the retaining ring 45 of the ball bearing assembly. The broken extension of the shaft 33 to the right of FIG. 5 extends into the body of the punch assembly and the details of that arrangement as shown in FIG. 6.

Figure 6:
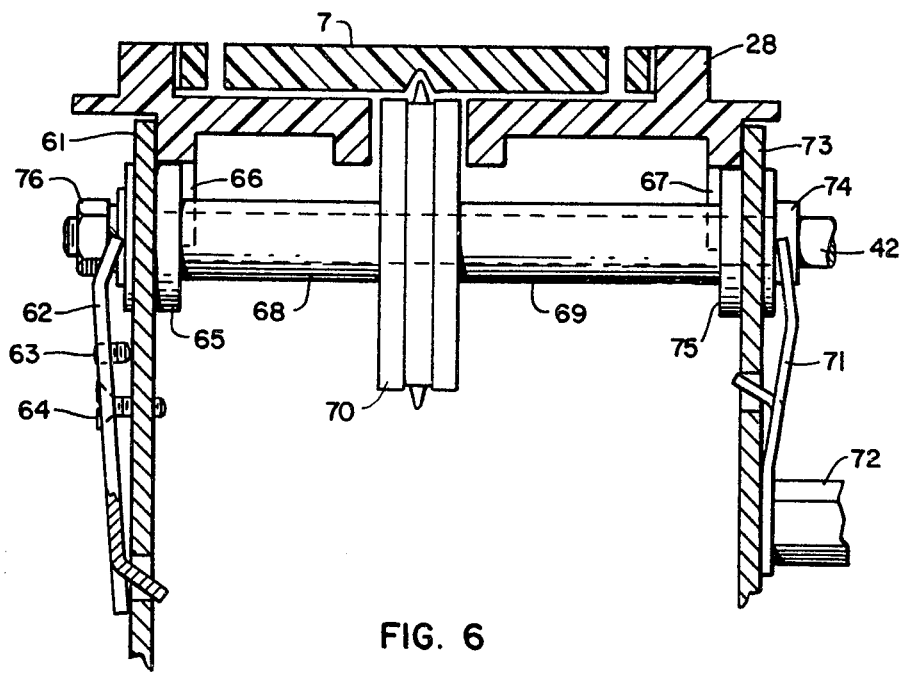
FIG. 6 illustrates the paper tape feed wheel assembly for both the punch and reader assemblies.

FIG. 6 illustrates the feed wheel assembly and the matter of achieving lateral adjustment thereof relative to lateral guide for the paper tape as the tape advances through the punch and reader assemblies. FIG. 6 illustrates the arrangement of the feed wheel assembly in the punch, however, lateral adjustment is achieved in the same manner in the reader assembly. The feed wheel assembly comprises the shaft 33, spacer 74 (this maintains clearance between the drive assembly 25 and the side plate 73), ball bearing assemblies 65 and 75, the spacers 68 and 69, the feed wheel 70, and the nut 76. Accordingly, the above referenced elements of the feed wheel assembly and drive mechanism e.g. 25 are all held on the shaft 33 in a fixed end-to-end relationship. The ball bearing assemblies 65 and 75 fit snugly within holes in the side plates 61 and 73, however, the fit is such that the entire assembly may be laterally moved relative to the two side plates. The side plates 61 and 73 are held spaced apart in a fixed relationship by spacers which are not shown. At the right side of FIG. 6 there is shown a spring assembly 71 which is secured to the side plate 73 by the post 72. The post 72 serves as the support and pivot for the detent 36 which is illustrated in FIG. 3. The spring 71 is arranged to bear inwardly against the retaining ring of the ball bearing assembly 75. At the left side of FIG. 6 there is shown an adjusting detail 62 which is secured to the side plate 61 by the screw 64 and is held in a spaced apart relationship from the side plate 61 by the set screw 63.

Figure 7:
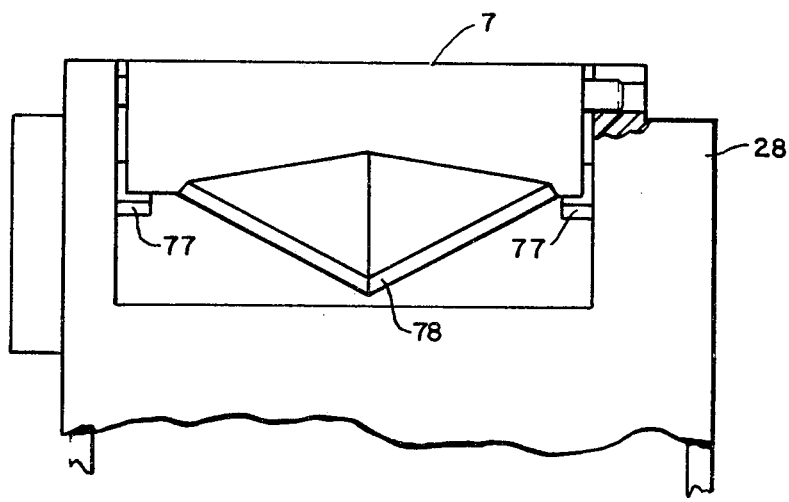
FIG. 7 illustrates the paper tape guide assembly for the paper tape punch.

FIG. 7 is an end view of the paper tape guide assembly for the punch assembly. The guide assembly comprises a cover 7 and a body 28. The body 28 has two downwardly extending projections 66 and 67 which have a curved surface which corresponds to an arc of the exterior surface of the ball bearing retainer rings 65, 75. The length of the arc slightly exceeds half the circumference of the outer surface of the retainer ring of the ball bearing assembly. Accordingly, the paper guide body is held in a fixed relationship to the ball bearing assembly and thus to the surface of the feed wheel 70. As seen in FIG. 6, the body 28 fits snugly between the side plates 61 and 73 and is thus held in fixed lateral relationship to the side plates. The curved surfaces of the body 28 which engage the retainer rings of the ball bearing assemblies 65, 75 are dimensioned such that the feed wheel assembly may be laterally moved in the same manner that the ball bearing assemblies may be laterally moved through the apertures in the side plates 61 and 73. In summary, the paper guide body 28 by virtue of the curved surface within the downward depending legs 66 and 67 is held in a fixed relationship with regard to the axis of the shaft 33 and thus with regard to the driving surface of the feed wheel 70. Paper tape which is being processed by a punch assembly is held in engagement with teeth of the feed wheel 70 by the cover 7 and is generally guided through the assembly between the bottom surface of the cover 7 and the upper surface of the body 28. A pointed tongue 78 protrudes downwardly from the cover 7 to provide a convenient way for removing a section of tape at the exit of the punch assembly.

The cover 7 of the paper guide assembly is held in spaced apart relation with the body 28 by the protrusions 77 which extend upwardly from the guiding surface of the body 28.

Further details of the feed wheel assembly and paper guide assembly of FIGS. 6 and 7 are illustrated in FIGS. 8, 9 and 10. FIG. 8 shows in plan view the arrangement shown at the left side of FIG. 6; FIG. 9 shows in plan view the arrangements shown at the right side of FIG. 6 and FIG. 10 specifically shows how the body 28 of the paper guide assembly engages the retaining ring of the ball bearing assembly 65, 75.

As shown in FIG. 8 and FIG. 10, the paper feed cover 7 is rotatably movable about a pivot from an open position (as illustrated in FIG. 8) to a closed position (as illustrated in FIG. 10). The cover 7 and the body 28 are arranged such that pin 83 in the cover 7 engage the slot 84 to hold the cover firmly in the closed position illustrated in FIG. 10. The paper feed assembly body 28 is secured to the punch assembly by the screw 82 which engages a spacer bar 85. The spacer bar 85 is secured to the side plate 61 by a screw 81.

FIG. 10 illustrates more clearly how the ball bearing assembly 65 is retained in the curved portion of the body 28 to provide a fixed physical relation between the outer surface of the feed wheel 70 and the surface of the body 28 which is utilized to guide the paper tape through the punch assembly.

Figure 11:
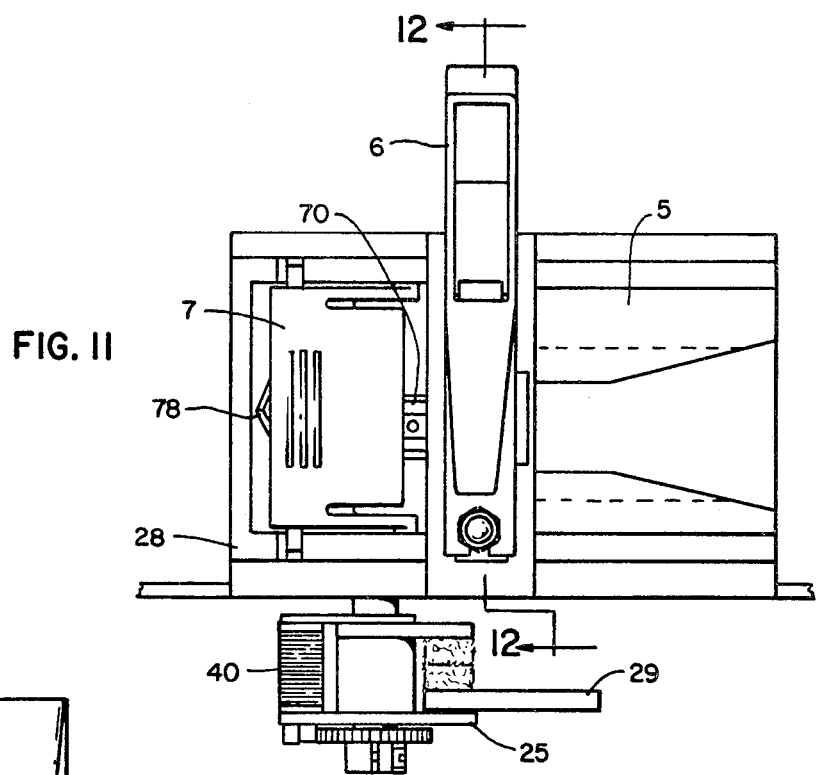
FIG. 11 is a top view of the paper tape feed and the chad chute in the punch assembly.
Figure 12:
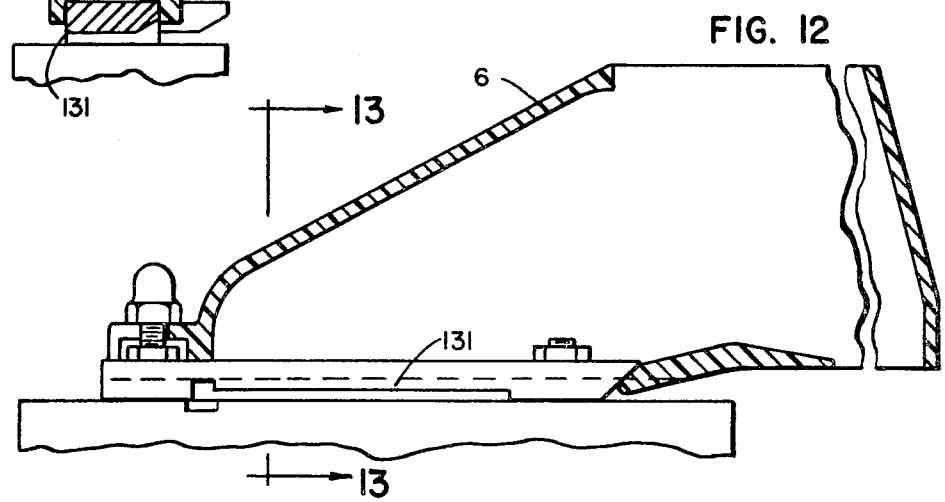

The top view of the paper tape punch assembly shown in FIG. 11 illustrates the tapered paper guide at the entrance to the punch block of the punch assembly, and the relation of the feed wheel 70 and the cover 7. The chad chute 6 serves to convey chad which is punched from the paper tape as it is processed to a chad receptacle. As seen more clearly in FIG. 12, the top of the chad chute is open. Accordingly, in the event that the chad box becomes filled to capacity, newly generated chad is merely released through the opening at the top of the chute.

Figure 13:
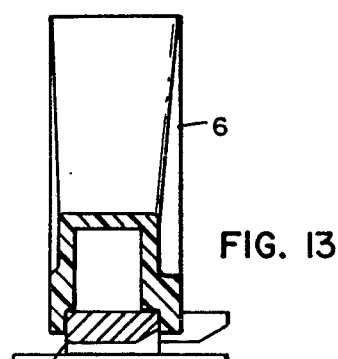
FIGS. 12 and 13 illustrate details of the chad chute.

FIG. 13 illustrates how the chad chute 6 is arranged to fit snugly over the punch block 131 such that the chad is isolated from the remainder of the assembly. FIG. 14 is a cross-sectional view of the chad chute 6. The internal surfaces of the chad chute are appropriately curved to effect separation of columns of chad to assure their disposal into the chad box 10.

FIG. 14 is a perspective view of a chad box 10 which is employed in the table top version of the combined punch and reader assembly of FIG. 1. In the event that the combined punch and reader assembly is to be mounted on a pedestal, the chad box of FIG. 14 may be replaced by the chad chute extender 151 shown in FIG. 15. The chad chute extender has an outward appearance which generally follows the appearance of chad box FIG. 14. However, the chad chute extender 151 of FIG. 15 has a membrane 152 for directing the chad into the output tube 153. The output tube 153 is connected to a chad box which may be mounted on the pedestal or alternately on the floor.

In FIG. 16 there is illustrated a section of 8 level punch paper tape which illustrates the longitudinally placed feed holes 161 and an illustrative pattern of 8 level codes.

What is claimed is:

1. A punched paper tape feed wheel mechanism comprising:
a frame comprising first and second sidewalls, spacer means for maintaining said sidewalls in parallel spaced apart relationship, said sidewalls having opposed first and second identical holes therein;
a paper guide assembly comprising: a body having a paper tape guide surface and a complementary cover for maintaining punched paper tape within the guide; said body proportioned to fit snugly between said sidewalls, means for securing said body to said frame; said body having a hole in said guiding surface for receiving a paper feed wheel; said body comprising first and second downwardly extending legs respectively adjacent the inner surface of said first and second sidewalls; each of said downwardly extending legs having a curved surface corresponding in size and shape to at least a portion of the said opposed holes in said sidewalls; said curved surfaces of said legs being aligned with said holes in said sidewalls when said body is secured to said frame; and a feed wheel assembly comprising: a shaft having a length exceeding the distance between said sidewalls, means attached to one end of said shaft for selectively rotating said shaft in equal increments, first and second ball bearing assemblies fixed on said shaft at a spacing corresponding to the distance between said sidewalls each of said assemblies comprising a race, a retaining ring and a plurality of bearing balls held between said race and said retaining ring, the outer dimensions of the retaining rings of said ball bearing assemblies corresponding to the dimensions of said holes and said sidewalls so as to provide a sung but slidable fit of said ball bearing assemblies in said sidewalls and with said curved surfaces of said downwardly extending legs; a paper drive wheel assembly affixed to said shaft intermediate said ball bearing assemblies; and means mounted on said sidewalls for adjusting the lateral position of said feed wheel assembly in said frame.

2. A punched paper tape guide assembly in accordance with claim 1 wherein said adjusting means comprises a flat plate attached to one of said sidewalls and arranged to engage the retaining ring of the corresponding one of said ball bearing assemblies for defining the lateral limit of motion of said feed wheel assembly in a first direction, means for adjusting the spacing of said flat plate from said corresponding sidewall, and spring means attached to the outer surface of said second sidewall arranged to engage the retaining ring of the ball bearing assembly mounted in the second one of said sidewalls and arranged to urge the feed wheel assembly against said flat plate.

3. A punched paper tape feed wheel mechanism in accordance with claim 1 wherein said body of said paper guide assembly has first and second openings for receiving first and second pins, and said complementary cover comprises first and second pins for respectively engaging said first and second openings in said body and wherein said cover is rotatable from a first closed position to a second open position to facilitate threading of paper tape through said guide assembly.

* * * * *